March 4, 1969 L. F. GOELLER, JR., ET AL 3,431,368
EQUIPMENT FOR TESTING SHOWERING RESISTANCE
ON COMMUNICATION LINES
Filed July 15, 1965
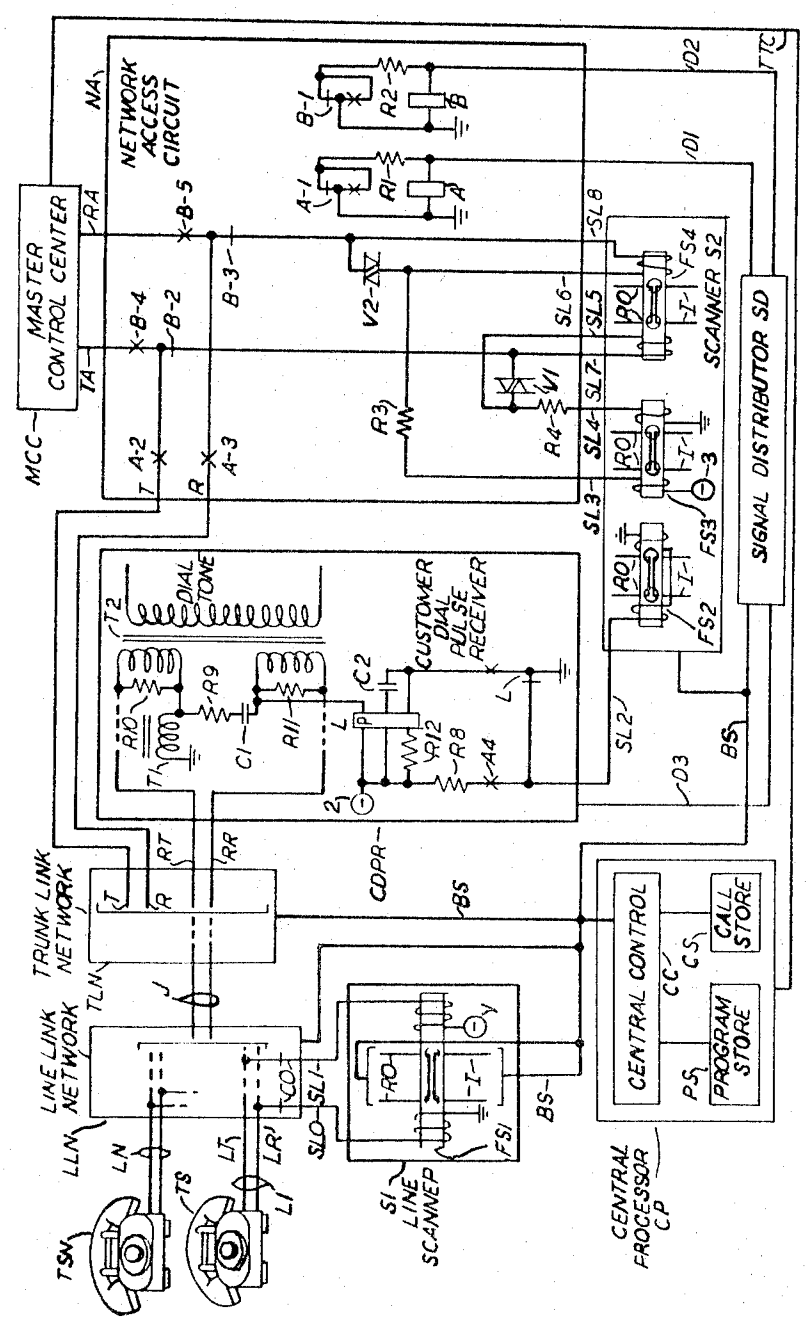
INVENTORS L.F. GOELLER JR.
J.M. NERVIK
BY [signature]
ATTORNEY 3,431,368
Patented Mar. 4, 1969

1

3,431,368

EQUIPMENT FOR TESTING SHOWERING RESISTANCE ON COMMUNICATION LINES

Leopold F. Goeller, Jr., Hazlet, N.J., and John M. Nervik, Bethesda, Md., assignors to Bell Telephone Laboratories, Incorporated, New York, N.Y., a corporation of New York Filed July 15, 1965, Ser. No. 472,233
U.S. Cl. 179—175.2 13 Claims
Int. Cl. H04m 3/22

ABSTRACT OF THE DISCLOSURE

A program controlled telephone system is disclosed with switching equipment which provides for the automatic testing of a telephone line immediately after a showering condition thereon initiates a call. The equipment includes ferrod and relay circuitry for performing tests under control of a central processor to distinguish between a low line current produced by a showering line resistance and a higher line current produced by a valid call on the line.

This invention relates to testing systems and particularly to equipment utilized in communication switching systems for automatically testing station lines for undesired electrical resistance.

A variety of manual and automatic testing arrangements is available in the prior art for checking the electrical resistance of station lines in communication switching systems, such as telephone, telegraph and computer systems. However, all of the known arrangements have proven ineffective for automatically checking and detecting when the resistance of such a line suddenly becomes low enough to cause a condition which is known in the art as showering. This is a condition in which a trouble, such as a false cross of conductors or moisture passing through the conductor insulation, lowers the resistance of a line sufficiently to effect the initiation of a call, but inadequately to hold the resultant call connections. As a consequence, after such connections are established, they are automatically released as an abandoned call and subsequently other such false call operations are repeated until the undesired line resistance is eliminated or the line is removed from service.

A showering condition has proven to be particularly troublesome in a present day switching system because it impairs the quality of communication service and increases the traffic burden as well as the operating costs of the system. It also causes a substantial amount of switching equipment to be unproductively used for the repeated calls. In addition, an appreciable amount of time is usually consumed in detecting and clearing the showering condition from the system.

Accordingly, it is an object of our invention to provide automatic equipment for testing communication lines for undesired electrical resistance.

Another object is to reduce service irregularities caused by a showering line condition.

It is another object of our invention to reduce the unproductive usage of switching equipment due to showering lines.

These and other objects are attained in accordance with an exemplary embodiment of our invention wherein facilities are integrated into a program controlled telephone system for automatically testing a customer line immediately after a showering condition thereon initiates

2 a call. The facilities automatically detect the showering condition with minimal delay and notify a craftsman of both the occurrence of the trouble and the identity of the line. After detecting such a condition, our invention automatically prevents false calls from being continually initiated and thereby virtually eliminates the unproductive usage of telephone switching equipment.

According to our invention, the facilities include a special line sensor in each customer line circuit and that sensor is responsive to either a conventional telephone call initiation or a showering condition for activating common control circuits that establish connections from the line through a switching network to a customer dial pulse receiver. We have also found it advantageous to equip the dial pulse receiver with a line supervisory relay which is less sensitive than the line sensor and which is responsive to a showering condition for activating the common control circuits to perform a series of tests.

These tests are made in response to instructions received from a stored program in the common control circuits. Initially, the control circuits are instructed to hold the connections from the dial pulse receiver through the switching network toward the calling line and to connect the line sensor to that line for testing. The sensor thereafter cooperates with the control circuits to ascertain whether a telephone receiver "on-hook" or "off-hook" signal is present on the line. An "on-hook" signal represents that there is no trouble on the line and that the circuit actions which have occurred may have been due to an abandoned call, a lightning surge on the line or the like. When no trouble is detected, the control circuits release the dial pulse receiver and the call connections through the switching network and then restore the line to regular service.

In contradistinction, an "off-hook" signal on the line signifies that a trouble exists, such as a showering condition on the line or an open path through either the switching network or the dial pulse receiver. As a result, the program controlled circuits automatically release the dial pulse receiver and change the connections through the switching network so that a network access and test circuit is connected to the line under test. The latter circuit selectively connects two sensor devices to the line under test for distinguishing between an "off-hook" signal due to a showering condition and one due to a valid telephone call. One of the devices senses a low line current produced by a showering line resistance which is higher than the line resistance produced by a valid telephone receiver "off-hook" telephone call. Each of the devices senses the higher line current present during a valid call.

If both of these devices are activated upon their connection to the line, the control circuits recognize that a valid call is awaiting service and that a trouble is present in the priorly used dial pulse receiver or the network connections. Consequently, the control circuits print trouble information concerning that receiver for use by a craftsman and connect the calling line through the switching network to another customer dial pulse receiver for service.

If only the more sensitive one of sensor devices is activated, the control circuits recognize that a showering condition exists on the line under tests and thereafter activates the network access circuit for connecting the line to a control center for maintenance.

It is a feature of our invention that equipment is provided for automatically testing communication lines for showering conditions.

Another feature is the provision of monitoring devices in a communication line circuit and a digit receiver for sensing a showering condition on a line and activating equipment which connects the line to a testing circuit that detects the showering condition.

Another feature is the provision of a testing circuit having a pair of sensor devices selectively connectable to a telephone line under test for differentiating between acceptable and unacceptable resistances on that line.

The foregoing objects, advantages and features, as well as others, of our invention may become more clearly understood by a reading of the following description of an exemplary embodiment thereof shown in the single sheet of drawing depicting a program controlled telephone system employing equipment illustrative of our invention.

Referring to the drawing, there is depicted an electronic program controlled telephone system wherein equipment in accordance with our invention may advantageously be employed. The system is of the type disclosed in The Bell System Technical Journal (B.S.T.J.), September 1964 (published after Oct. 15, 1964), vol. XLIII, No. 5, Parts 1 and 2; and in the copending A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963. The latter disclosures and the patent applications referred to therein may be consulted for a complete understanding of the construction and operation of the scanners S1 and S2, signal distributor SD, customer dial pulse receiver CDPR, central processor CP, and the master control center MCC. While certain of the circuit details of the line and trunk link networks LLN and TLN are set forth in the aforementioned disclosures, more definite specifications of these networks are presented in the following copending patent applications: T. N. Lowry, Ser. No. 205,920, filed June 28, 1962, now U.S. Patent No. 3,231,679 issued Jan. 25, 1966; A. Feiner, Ser. No. 253,083, filed Jan. 22, 1963, now U.S. Patent No. 3,257,513 issued June 21, 1966; and K. S. Dunlap-A. Feiner-R. W. Ketchledge-H. F. May, Ser. No. 295,458, filed July 16, 1963, now U.S. Patent No. 3,281,539 issued Oct. 25, 1966. Reference may also be made to the R. N. Breed-A. H. Budlong-R. C. Casterline-B. J. Lewis patent application Ser. No. 472,184, filed July 15, 1965.

The electronic switching system is designed to serve many different telephone stations, such as stations TS1–TSN. Each such station is connected to the switching office over a telephone line, such as line L1, and is terminated in both a line link network LLN and a line scanner S1. Network LLN comprises switching facilities for establishing communication connections from station lines, such as lines L1–LN to the trunk link network TLN via network wire junctors J. Similarly, the network TLN includes switching facilities for establishing connections from the junctors J to customer dial pulse receivers, such as receiver CDPR; network access and test circuit NA; and other functional circuits, such as trunk circuits (not shown).

Line scanner S1 is utilized for sampling, or scanning, the lines L1–LN for telephone receiver "off-hook" and "on-hook" signals. In like fashion, the scanner S2 scans the dial pulse receiver CDPR, access circuit NA and other such circuits for "off-hook" and "on-hook" signals and other supervisory data concerning an associated telephone. The scanning operations are performed at various times in response to program instructions from the central processor CP.

A substantial amount of the logic, control, memory, supervision and translation functions involved in establishing connections from station lines through the networks LLN and TLN to functional circuits, such as receiver CDPR and access circuit NA, and for the operation of the various circuits is performed by common control equipment including the central processor CP. Accordingly, a minimal amount of control circuitry is needed in the individual receivers and access circuits and only the essential switching devices and transmissions apparatus are included therein. The switching devices, in most instances, comprise magnetic latching relays, for example relays A and B in the access circuit NA, which relays are connected to a signal distributor SD over the leads D1 and D2. As disclosed in the cited XLIII B.S.T.J., Part 2, beginning at p. 2270, this distributor acts as a buffer between the high speed central processor CP and the relatively slow speed latching relays to provide for the operation of the relays whereby the circuits are switched into the different functional states required for serving calls and testing leakage resistance on station lines. Distributor SD causes the operation and the subsequent release of the latching relays upon the receipt of program instructions from the processor CP.

Communications between the distributor SD, scanners S1 and S2, and processor CP are by way of bus systems which provide discrete communication paths between selected ones of the circuits. These systems are described in the XLIII B.S.T.J., Part 1, pp. 2021 to 2054 and are represented herein by the bus BS.

As set forth in the cited B.S.T.J. beginning at p. 1845 and in Doblmaier et al., the central processor CP is a centralized data processing facility which is employed to implement the various telephone administrative and maintenance functions of the system. It is functionally divided into three units comprising a call store CS, program store PS and a central control CC. The call store CS is a temporary, or erasable, memory facility which employs apparatus for storing information pertaining to calls in progress as well as showering line conditions. Such information includes: (1) the busy-idle status of communication paths through networks LLN and TLN; (2) the dialed digits received by a customer dial pulse receiver CDPR; (3) the busy-idle status of the network access circuit NA; and (4) other data utilized for testing lines for showering conditions.

The program store PS is a semipermanent memory facility which is employed to store the less changing system information including the system programs and a variety of translation information. Facilities are also furnished in the program store PS for deriving semipermanent information required for routing, charging and ringing and the like on telephone calls, as well as for selectively establishing connections during showering line resistance tests.

The central control CC is the primary information processing unit of the system. It is capable of executing one at a time many different types of basic instructions, or orders, required for controlling the line and trunk link networks, dial pulse receivers, and scanners network access circuit during telephone calls and line leakage resistance tests. These instructions are written in the form of programs which are stored in the program store PS. The program instructions are the vocabulary of the system and are used to inform the switching circuits of the system how and when to perform their various functions. The central control CC requests an instruction from the program store every few microseconds and, upon receiving it, executes, or commands, the appropriate circuit to carry out the appropriate functions. Accordingly, the central control CC is the hub of the system which originates all addresses and commands to other circuits and receives back all answers from those circuits. It is important to note, however, that the central control CC is capable only of executing individual instructions and that the mechanized intelligence needed for the complex switching functions of the system resides in the stored programs.

The principles and organization of the stored program facilities of the illustrative switching system are disclosed in the cited B.S.T.J. beginning at p. 1923. The specific programming of work operations for the illustrative equipment of our invention is not explained in detail herein inasmuch as such information is at the discretion of the system programmer and his decisions are based upon the size and traffic requirements of the particular telephone office.

Scanners S1 and S2 comprise a plurality of ferrod sensors, such as ferrods FS1–FS4, for monitoring "on-hook," "off-hook," digit signals and other supervisory data for station lines L–LN, dial pulse receiver CDPR and access circuit NA. Each such ferrod is connected to an individual strategic point of the functional circuit over certain of the scan leads SL0–SL 8. A ferrod comprises a rod, or stick, of ferromagnetic material switch, in closed flux paths, exhibits remanent flux switching characteristics, but which is substantially nonremanent about its elongated, open flux path dimension. Around the stick is wound a pair of control windings. In addition, a ferrod comprises an interrogate winding I and a read-out winding RO, each of which is threaded through each of a pair of holes in the ferrod stick. The periphery of each such hole exhibits remanent flux switching characteristics. When a prescribed amount of current flows through the control windings of a ferrod, the ferromagnetic material is saturated and its incremental permeability approaches that of air. This saturated state is assumed by a ferrod, as later explained, when an "off-hook" or a low enough line leakage resistance (showering resistance) condition is present on a station line. When less than the prescribed current flows through the control windings, the permeability of the ferromagnetic material is relatively higher since it is not saturated. This low-high permeability characteristic of a ferrod is utilized for enabling the device to sense the "off-hook" and "on-hook" signals and for interrogating and reading out the sensed signals.

As disclosed in Doblmaier et al., interrogating pulses are periodically applied to the interrogate winding of each of the ferrods during a scanning operation under control of program instructions from the central processor CP. When the interrogated ferrod is not saturated by the current through its control windings, the interrogate pulse is coupled by transformer action to the read-out winding RO of the ferrod for indicating an "on-hook" signal. On the other hand, when the ferrod is saturated, the interrogate pulse is essentially not coupled to the ferrod read-out winding RO. The processor CP utilizes the read-out data for detecting service requests, dialed digits and line leakage resistance.

J. A. Baldwin, Jr.-H. F. May Patent 3,175,042, dated Mar. 23, 1965 and the cited B.S.T.J., pp. 2257 et seq. may be consulted for additional disclosure of the structure and operation of ferrods.

The telephone line circuit for station TS1 is typical of the line circuits used in the system. It comprises a telephone instrument at station TS1, line L1, cutoff contacts CO of network LLN, scan leads SL0 and SL1, the ferrod FS1 and the negative potential 1. When the telephone of station TS1 is "on-hook" and a tolerable leakage resistance is present on line L1, the ferrod FS1 is not saturated. When the telephone is "off-hook" or the line leakage resistance is low enough to cause a showering condition, the circuit through the control windings of ferrod FS1 is completed and the ferrod is saturated.

As disclosed in the Doblmaier et al. application (FIG. 102), each customer dial pulse receiver, for example receiver CDPR, comprises a polarized line supervisory relay L which is selectively connectable to the leads RT and RR during a call for detecting "off-hook" and "on-hook" dialing and line supervision signals received from a calling line. Relay L is operated and released in response to received "off-hook" and "on-hook" signals for repeating these signals over the scan lead SL2 to the scanner S2 for subsequent use by the central processor CP. Relay L is operable for detecting "off-hook" signals over the path including the negative potential 2 through its upper winding through the resistor R11 and lower winding of transformer T2 in parallel, lead RR, a lead through the networks TLN and LLN, the closed telephone station loop, another lead through networks LLN and TLN, and upper winding of transformer T2 and resistor R10 in parallel, and inductor T1 to ground. Upon operating, relay L actuates its transfer contact for saturating the ferrod FS2 in scanner S2 and thereby repeating the detected "off-hook" signal. Ferrod FS2 is saturated over the path from ground through its serially connected control windings, scan lead SL2, contact A4 of a magnetic latching relay A (FIG. 102 of Doblmaier et al.) and resistor R8 to potential 2 after relay L opens its break contact to remove the shunting ground from lead SL2. Relay L releases when its operate path is opened by "on-hook" signal on line L1. In releasing, relay L closes its break contact to reapply ground to lead SL2 for unsaturating ferrod FS2.

In accordance with our invention, relay L advantageously has higher nonoperate and release current values than the operate (saturate) current value of line ferrods, such as ferrod FS1, of scanner S1. This sensitivity arrangement enables the occurrence of a showering condition (prescribed low leakage resistance) on a line to saturate the line ferrod whereby that line is connected through networks LLN and TLN to a dial pulse receiver CDPR, but it prevents the relay L from operating or remaining operated due to the showering condition and thereby initiates the test sequence of our invention.

Network access and test circuit NA is employed for selectively extending station line connections from the network TLN to the master control center MCC and to a pair of ferrods FS3 and FS4 in scanner S2 for testing the line leakage resistance. Leads T and R from network TLN are selectively interconnected with leads TA and RA to center MCC under control of contacts of the relays A and B. Each of these relays is operated by a pulse of one polarity on the associated lead D1 or D2 and is subsequently released by another pulse of opposite polarity on the same lead. These pulses are supplied by the signal distributor SD under control of program instructions from the central processor CP. The control path for each of the relays A and B includes a break-before-make contact A–1 or B–1 and a resistor R1 or R2 which shunts the relay winding. Relay A or B is operated when distributor SD applies a momentary pulse potential to the associated lead D1 or D2 and thereby completes the operate path through the relay winding to ground. Upon operating, the relay momentarily opens its contacts A–1 or B–1 to cause a transient increase of pulse current flow over the associated lead D1 or D2. Distributor SD detects this increase and is thereby notified that the relay has been operated. The operation of relay A or B magnetically latches, or locks its contacts in the actuated position.

In operating, relay A connects ferrod FS3 and FS4 in series across leads T and R for testing the resistance of the loop connections through networks TLN and LLN to one of the lines L1–LN. The connections are from the negative potential 3 and ground through the control windings of ferrod FS3, scan leads SL3 and SL4, resistors R3 and R4, scan leads SL5 and SL6, control windings of ferrod FS4, scan leads SL7 and SL8, and contacts B–2, B–3, A–2 and A–3 to leads T and R. According to our invention, ferrod FS4 is used in this configuration for sensing the current flow produced by a showering line resistance which causes false call originations at line scanner S2. Ferrod FS4 is more sensitive than ferrod FS3, which does not sense a showering condition. Ferrod FS3 is used for sensing a valid "off-hook" signal on a calling line. In addition, ferrods FS3 and FS4 are used for checking the continuity of the circuit path through networks TLN and LLN to the station line.

Resistors R3 and R4 limit the current flow in the control windings of ferrod FS3 which may be produced by potential 3 on short station lines and lightning surges on such a station line. Varistors V1 and V2 regulate the amount of current flow through ferrod FS4 and enable more current to flow in a closed circuit over leads T and R than through the ferrod FS4 control windings.

The operation of relay B disconnects the ferrods FS3 and FS4 from leads T and R at contacts B–2 and B–3. It also extends the line connections from leads T and R through contacts A–2, A–3, B–4 and B–5, and leads TA and RA to the master control center MCC whereat a craftsman follows established maintenance procedures for eliminating the showering condition from the associated station line.

Turning now to the manner in which the system serves showering conditions, it is assumed for illustration that a low resistance of a magnitude sufficient for causing a showering condition exists between the two conductors LT and LR due to the leakage resistance in the insulation of line L1. When the low resistance arises between conductors LT and LR, it appears as a telephone receiver "off-hook" and causes ferrod FS1 to be saturated over the path from conductors LT and LR, contacts CO, leads SL0 and SL1 and the FS1 ferrod control winding to potential 1 and ground. Subsequently, the central control CC, in executing a line scanning operation as disclosed in the cited B.S.T.J. and Doblmaier et al., interrogates ferrod FS1 by applying pulses via scanner S1 and winding I of ferrod FS1 and reads-out an "off-hook" signal at its winding RO. The central control CC knows the scanners address of line L1 and uses it to refer to a translating area the service information it needs concerning line L1.

The central control CC then selects an idle customer dial pulse receiver CDPR. Next, the control CC ascertains the availability of an idle path from line L1 through networks LLN and TLN and a junctor J to receiver CPDR by consulting the busy-idle data stored in the call store CS for all paths through the networks. Upon finding such a path, the control CC sends instructions to networks LLN and TLN to establish the appropriate connections. Thereafter, the cutoff contacts CO are opened to disconnect ferrod FSI from line L1 to avoid any transmission degradations on line L1 due to scanner circuitry. The central control CC then requests the distributor SD to operate apparatus in the receiver CDPR over leads D3 for successively switching that receiver whereby it performs a power cross test and then transmits dial tone to the line L1 as disclosed in Doblmaier et al.

When receiver CDPR is switched into its "dial tone and digits" state as disclosed in Doblmaier et al., relay L is connected to line L1 over the path from potential 2 through the upper winding of relay L, lower primary winding of transformer T2, lead R3, a path through networks TLN and LLN, the leakage resistance of line L1, another path through networks LLN and TLN, lead TB, the upper primary winding of transformer T2, and transformer T1 to ground. Relay L is normally operated over such a path whenever an "off-hook" signal is present on a station line; however, because resistance of line L1 is of a showering magnitude, insufficient current flows in the described circuit for operating relay L or, if it operates, it does not hold operated.

As previously described, relay L repeats "on-hook" and "off-hook" supervisory and digit signals from line L1 to ferrod FS2 over SL2 and the processor CP periodically scans ferrod FS2 to detect these signals. In the presence of a showering condition on line L1, processor CP detects a prolonged "on-hook" signal on line L1 via ferrod FS2 and determines that either an abandoned call or a trouble condition exists. Consequently, processor CP is operative according to our invention to hold the connections from receiver CDPR via networks TLN and LLN toward line L1 and to reclose contacts CO for reconnecting line L1 to ferrod FS1. If a valid call had been initiated on line L1 and then had been abandoned, ferrod FS1 would not be saturated and processor CP would scan that ferrod for sensing an "on-hook" condition representing the abandoned call. Processor CP would then release networks TLN and LLN as well as receiver CDPR and make them available for serving other calls.

On the other hand, a showering condition on line L1 or a valid call thereon which is awaiting service on line L1 because of trouble in the network TLN or LLN or the receiver CDPR, causes the ferrod FS1 to be saturated over the previously described path. When processor CP later scans ferrod FS1 and thereby detects an "off-hook" signal on line L1, it connects line L1 via a new path through networks LLN and TLN to lead T and R of the network access circuit NA for testing. Next, the processor CP instructs the distributor SD to operate relay A as explained previously for connecting ferrods FS3 and FS4 over leads T and R. If a valid call were present on line L1 at this time, both ferrods FS3 and FS4 would saturate due to the valid "off-hook" condition of that line. As a result, processor CP would afterwards detect the valid call during its scanning operation and cause Line L1 to be connected to another customer dial pulse receiver for service. Processor CP also effects the release of the connections from line L1 through networks LLN and TLN. In addition, processor CP controls a teletypewriter printing of information pertaining to the trouble for a craftsman at the master control center MCC via the teletypewriter channel TTC as set forth in the cited B.S.T.J. beginning at p. 2283.

When the showering condition exists on line L1 only ferrod FS3 is saturated and the processor CP detects this condition during the scanning operation and then instructs distributor SD to operate relay B for connecting line L1 via leads T and R, contacts A–2, A–3, B–4 and B–5, and leads TA and RA to center MCC. Processor CP also controls the printing of a teletypewriter message at center MCC for enabling a craftsman to follow established maintenance procedures for eliminating the showering condition from line L1.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:

1. In combination, a communication line, a test circuit, and means automatically responsive to the occurrence of a predetermined resistance on said line for connecting said line to said circuit, said circuit comprising a potential source, a pair of monitoring devices, each of said devices having an energizing element connectable in a series circuit with said potential source and the connection to said line for energizing one of said devices to sense an unacceptable resistance on said line and both of said devices to sense acceptable resistance on said line.

2. In combination, a two-conductor communication line, a test circuit, and means automatically responsive to the occurrence of a predetermined resistance on said line for connecting said line to said circuit, said circuit comprising first and second sources of electrical potential, a pair of sensors for distinguishing between acceptable and unacceptable resistances on said conductors, each of said sensors having a pair of control windings, each of said windings of a first one of said sensors being connected in series with one of said potential sources and with one of said windings of the other one of said sensors, and a pair of input conductors selectively connectable in series with said windings of each of said sensors and said connections to said line.

3. The combination in accordance with claim 2 wherein said test circuit further comprises a pair of resistors each of which is individually connected in series with one of said windings of said first one of said sensors, and a pair of varistors each of which is individually connected between termini of one of said windings of said other one of said sensors.

4. The combination in accordance with claim 3 wherein each of said sensors comprises a ferrod, and said test circuit further comprises a pair of output conductors and a pair of electromechanical switching elements, one of said elements being responsive to the receipt of a control signal for connecting said input conductors to said windings of said other one of said sensor ferrods and the other one of said elements being responsive to the subsequent receipt of another control signal for connecting said input conductors to said output conductors.

5. A communication switching system having a line circuit including a communication line and a monitoring device, a switching network operable for establishing communications from said communication line, a signal receiver circuit, said device being responsive to any of a plurality of different electrical signals on said communication line for controlling the operation of said network to establish communication connections from said communication line to said receiver circuit, a sensing circuit for individually sensing each of said plurality of electrical signals, and means in said receiver circuit responsive to the receipt of a prescribed one of said electrical signals over said established connections for controlling the operation of said network to establish connections from said communication line to said sensing circuit.

6. A communication switching system in accordance with claim 5 wherein said sensing circuit comprises a plurality of sensor elements selectively connectable over said established connections to said line and being operable in predetermined combinations for sensing each of said plurality of signals.

7. A communication switching system having a communication line; a signal receiver means; a switching network operable for establishing communication connections between said line and receiver means; a line circuit comprising a monitoring device connectable to said line and being responsive to any of a plurality of different electrical signals on said line for controlling the operation of said network to establish said connections, and switch means subsequently controllable by said network for disconnecting said line from said device; and means in said receiver means responsive to the receipt of a prescribed one of said signals over said established connections for controlling said switch means to reconnect said line to said device; and said device being thereafter responsive to said prescribed one of said signals for signifying a predetermined electrical condition on said line.

8. A communication switching system having a communication line; a switching network operable for establishing communication connections from said line; signal receiver means; a line circuit comprising a monitoring device connectable to said line and being responsive to any of a plurality of different electrical signals on said line for controlling the operation of said network to establish said connections from said line to said receiver means, and switch means subsequently controllable by said network for disconnecting said line from said device; means in said receiver means responsive to the receipt of a prescribed one of said signals over said established connections for controlling said switch means to reconnect said line to said device; and apparatus for individually checking each of said plurality of electrical signals, and said device being responsive to said prescribed one of said signals upon said reconnection to said line for controlling the operation of said network to establish connections from said line to said checking apparatus.

9. In a telephone system, telephone lines, a data receiver, link connector means operable for establishing connections between any one of said lines and said receiver, means for sensing a prescribed resistance on any one of said lines, common control means activated by said sensing means upon the occurrence of said prescribed resistance on said one line for operating said connector means to establish connections between said one line and said receiver, a resistance test circuit, detector means in said receiver responsive to the resistance on the established connections for cooperating with said sensing means to activate said control means for further operating said connector means to establish connections between said one line and said circuit, and means in said circuit activated by said control means for testing said line to distinguish between resistance values thereon due to a fault condition and a telephone calling condition.

10. In a telephone system as set forth in claim 9, the combination wherein said sensing means comprises an individual sensing device for each of said lines and each such device being responsive for sensing line resistances due to a fault condition and a calling condition, and wherein said detector means is insensitive to a prescribed line resistance due to a fault condition and is sensitive to detect a line resistance due to a calling condition.

11. A program controlled telephone system comprising a plurality of telephone lines; a data receiver; link connector means operable for establishing connections between any of said lines and said receiver; a line scanner having an individual ferrod associated with each of said lines for sensing a predetermined resistance on said associated lines; common control means having stored program instructions, means responsive to said instructions for interrogating each of said ferrods to read-out a line calling condition from the associated one of said ferrods upon the occurrence of said prescribed resistance on the associated line, and means responsive to the read-out condition and other of said instructions for controlling the operation of said connector means to establish connections between the calling line and said receiver; apparatus in said connector means responsive to the establishment of said connections for disconnecting said calling line from the associated ferrod; said receiver comprising means connectable to said established connections for detecting the receipt of first and second signals for said calling line, and means activated under control of program instructions from said control means for connecting said detecting means to said established connections; another scanner having a ferrod controllable by said detecting means for sensing received signals from said calling line; said control means further including means responsive to program instructions for interrogating said ferrod of said other scanner to detect said sensed signals, and means responsive to the detection of a prolonged first signal on said established connections for controlling said apparatus in said connector means to connect said calling line to its associated ferrod; and a resistance test circuit; said common control means being thereafter responsive to program instructions for interrogating said ferrod associated with said calling line to read-out a calling condition and for further controlling said connector means to establish connections between said calling line and said test circuit; and said test circuit comprising a pair of serially connected ferrods for selectively sensing resistances on said calling line caused by a valid calling condition and by excessive line leakage.

12. A communication switching system comprising a communication line, a data receiver, switch means operable for establishing connections between said line and said receiver, control means responsive to a service request on said line for operating said switch means to establish said connections, equipment for checking the resistance of said line, and means controllable by said receiver for further operating said switch means to establish connections between said line and said equipment for checking said line resistance.

13. A telephone switching system comprising: a telephone line, means for detecting a service request resistance condition of said line, a signal receiver connectable to said line after detection of said condition, means for releasing said signal receiver from said line in the absence of a valid service request resistance condition, and test means connectable to said line on the continued detection of said condition by detecting means for distinguishing between valid and invalid service request conditions, said test means including a pair of scanning elements connected in series and of different sensitivities and means for connecting said scanning elements of said line.

No references cited.

KATHLEEN H. CLAFFY, *Primary Examiner.*

ARTHUR A. McGILL, *Assistant Examiner.*

U.S. Cl. X.R.

328—111